United States Patent
Karpenko et al.

(10) Patent No.: US 10,352,394 B2
(45) Date of Patent: Jul. 16, 2019

(54) ELASTOMERIC BUSHING HAVING EMBEDDED STRUCTURES FOR IMPROVED THERMAL CONDUCTIVITY AND DAMPING CAPACITY

(71) Applicant: Ford Global Technologies, LLC, Dearborn, MI (US)

(72) Inventors: Yuri A. Karpenko, Brighton, MI (US); Sheri Callies, Canton, MI (US); David Allen, Grosse Ile, MI (US); Chad Doorlag, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 15/468,996

(22) Filed: Mar. 24, 2017

(65) Prior Publication Data
US 2018/0274624 A1 Sep. 27, 2018

(51) Int. Cl.
*F16F 1/38* (2006.01)
*F16F 13/04* (2006.01)
(Continued)

(52) U.S. Cl.
CPC ............... *F16F 13/04* (2013.01); *F16F 3/12* (2013.01); *F16F 15/022* (2013.01);
(Continued)

(58) Field of Classification Search
CPC .......... F16F 1/38; F16F 1/3835; F16F 1/3842; F16F 1/362
See application file for complete search history.

(56) References Cited

U.S. PATENT DOCUMENTS 2,179,469 A * 11/1939 Germonpres ........... F16F 1/424
                                                     267/141.7
3,161,407 A    12/1964 Robin
(Continued)

FOREIGN PATENT DOCUMENTS

CN    102135151 A    7/2011
CN    203098721 U    7/2013

OTHER PUBLICATIONS

Adnan Akay, "Acoustics of Friction" Tutorial Paper, Mechanical Engineering Department, Carnegie Mellon University, 2002, Acoustical Society of America, pp. 1525-1548.

*Primary Examiner* — Bradley T King
(74) *Attorney, Agent, or Firm* — LeClairRyan

(57) ABSTRACT

An elastomeric bushing for vehicle suspension includes inner and outer metal tubes, an elastomeric material between the tubes, and one or more bundles of woven wires (ropes or cables) in entangled or mesh form wherein at least a portion of the wires contact at least one of the tubes. The bushing has enhanced thermal conductivity via metal-to-metal contact and improved damping capacity to reduce heat buildup inside the material upon cyclic loading and unloading. The metallic wire rope, metallic wire ropes or wire mesh are embedded in the elastomeric material during injection molding where the ends of the wire ropes are attached to the opposing side walls of the inner and outer metal tubes or are spaced apart from the opposing side walls for tunability and to thereby enable a more effective dissipation of the heat generated inside the elastomeric bushing during its usage into the kinematically connected suspension members.

20 Claims, 8 Drawing Sheets

(51) Int. Cl.
*F16F 15/08* (2006.01)
*F16F 3/12* (2006.01)
*F16F 15/02* (2006.01)

(52) U.S. Cl.
CPC ........ *F16F 15/085* (2013.01); *B60G 2204/41* (2013.01); *F16F 2224/025* (2013.01); *F16F 2226/04* (2013.01); *F16F 2230/40* (2013.01)

(56) References Cited

U.S. PATENT DOCUMENTS

| | | | |
|---|---|---|---|
| 3,447,846 A * | 6/1969 | Marsh | F16C 27/066 384/536 |
| 3,704,877 A * | 12/1972 | Nunes | B29C 70/14 188/372 |
| 3,869,113 A * | 3/1975 | Dudek | F16F 1/366 267/282 |
| 5,062,618 A * | 11/1991 | Yamada | F16F 1/371 267/140.4 |
| 7,679,245 B2 * | 3/2010 | Brackett | F16C 32/0427 310/90.5 |
| 8,382,080 B2 * | 2/2013 | Suchta | F16F 1/368 188/321.11 |
| 2007/0045918 A1 | 3/2007 | Thornhill et al. | |
| 2007/0085251 A1 | 4/2007 | Kikuchi et al. | |
| 2012/0087611 A1 * | 4/2012 | Habibvand | F16C 19/52 384/499 |
| 2012/0313307 A1 * | 12/2012 | Cartwright | C08J 5/042 267/141 |
| 2014/0021665 A1 * | 1/2014 | Han | F16F 7/00 267/140.3 |

* cited by examiner

ELASTOMERIC BUSHING HAVING EMBEDDED STRUCTURES FOR IMPROVED THERMAL CONDUCTIVITY AND DAMPING CAPACITY

TECHNICAL FIELD

The disclosed inventive concept relates to bushings for vehicle suspensions having embedded structures for improved thermal conductivity and damping capacity. More particularly, the disclosed inventive concept relates to an elastomeric bushing for a vehicle suspension having embedded ropes formed by bundles of wires. The ropes are embedded in the bushing during the molding process. The plural individual wires may be either linear or twisted relative to one another. The bushings with embedded structures according to the disclosed inventive concept have a broad variety of applications including automotive products, particularly in the case of vehicle suspensions, and non-automotive products.

BACKGROUND OF THE INVENTION

An elastomeric bushing is a structural element which is primarily although not exclusively used in vehicle suspension systems. The primary task of elastomeric suspension bushings is to provide isolation of the vehicle body from undesired vibration and shocks without affecting the steering, ride, and handling characteristics of the vehicle during its useful life. The elastomeric bushing kinematically links two suspension members while dampening the loads they transmit from the wheel to the body or the frame of the vehicle. Vehicle suspension bushings typically consist of an annular cylinder of an elastomeric material (e.g., natural rubber, synthetic rubber or polyurethane) inside a metallic casting or outer tube. Often they also include an internal crush tube which protects the bushing from being crushed by the bushing clamping features.

In recent years, due to global warming concerns, regulation of the vehicle emissions of $CO_2$ has become more stringent. This has driven a high demand for vehicle weight reduction but without any compromise in the customer ride quality and comfort which has presented a challenge when designing suspension bushings using conventional elastomeric materials that have inherent physical limitations.

For elastomeric materials, the relationship between the force or moment applied to the outer or inner sleeve or the tube of the bushing and the relative displacements or rotations is nonlinear, namely, the one that has pronounced elastic hysteresis. Correspondingly, elastomeric bushings transfer the deformation strain energy into heat during their loading and unloading, thus providing damping to the joint. Excessive heat tends to harden the elastomeric material. As the bushing material hardens, it tends to crack, break, and then disintegrate. Its temperature determines the life of a bushing. Rough road conditions and/or defective shock absorbers or struts will allow excessive suspension movement creating more heat, which shortens the life of the bushings. Elastomeric materials commonly used in vehicle suspension bushings have relatively low thermal conductivity which does not allow for a quick transmission of the heat away from elastomeric material to the inner or outer bushing sleeves. To address such a challenge, hydraulically damping suspension bushings that utilize the principle of the hydraulic damping have been developed as illustrated, for example, in U.S. Pub. No. 2007/0045918 A1. However, these types of bushings are relatively expensive and, as a result, are not widely used in production. Therefore, an increase in the overall thermal conductivity of suspension bushings is highly desired for more effective heat dissipation into environment in order to prevent the undesirable noise and vibration levels or even a total bushing failure due to the material fatigue.

As in so many areas of manufacturing technology, there is always room for improvement related to undesirable noise and vibration associated with metallic materials conventionally used in a wide array of mechanical and structural components.

SUMMARY OF THE INVENTION

The disclosed inventive concept relates to the improving of thermal conductivity and damping capacity of an elastomeric bushing. These two objectives are achieved by embedding one or a few metallic wire ropes or a metallic mesh between an inner metal tube and an outer metal tube of a bushing during the molding process. At least a portion of the ropes or mesh are initially positioned in contact with either the inner metal tube or the outer metal tube or are in contact with both tubes Since metallic materials have much higher thermal conductivity compared to conventional elastomeric materials, the embedded wires enable a more effective heat dissipation through the metal tubes which is generated inside the elastomeric bushing material upon its dynamic deformation. Embedding a metallic wire, metallic wire ropes or a metallic mesh into an elastomeric bushing also allows utilizing the well-known benefits of inter-wire friction which helps to improve the bushing vibration damping properties.

Suspension members usually move in three-dimensional space. Correspondingly, suspension bushings are subjected to deformation in several modes simultaneously where they transmit significant loads mainly in their two principal (radial and axial) directions. In the radial direction, bushings demonstrate high stiffness owing to combined shear, compression and extension of an elastomeric material. In the axial direction, bushings show lower stiffness, as in in this case only shear deformation is present. In two remaining deformation modes (torsional and conical) bushings are much more compliant and act primarily as kinematic joints.

Non-uniform bushing stiffness may reduce the suspension mechanism stiffness in some directions resulting in additional degrees of freedom for the suspension. Under these conditions, bushings still have to fulfill their primary tasks, i.e., to provide isolation of the vehicle body from undesired vibration and shocks, without affecting the steering, ride, and handling characteristics of the vehicle.

The disclosed bushing demonstrates an enhanced thermal conductivity and improved damping capacity which help to reduce heat buildup inside the elastomeric material upon its cyclic loading and unloading, thereby increasing the service life of the bushing. The increase in the thermal conductivity and enhanced damping capacity of the bushing is due to embedding a metallic wire rope, metallic wire ropes or wire mesh in contact with one or both of the metal tubes into an elastomeric material during its injection molding operation where the ends of the wire ropes are selectively attached to the opposing side walls of the inner and outer metal tubes or are spaced apart from the opposing side walls for tunability and to thereby enable more effective dissipation of the heat generated inside the elastomeric bushing during its usage into the kinematically connected suspension members and then into the environment. Another benefit of embedding a metallic wire, metallic wire ropes or a metallic mesh into an elastomeric bushing is utilizing well-known benefits of inter-wire friction which develops between the surfaces of individual wires upon dynamic loading, to improve the bushing vibration damping properties provided mainly by the non-linear stress-strain relationship of an elastomeric.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
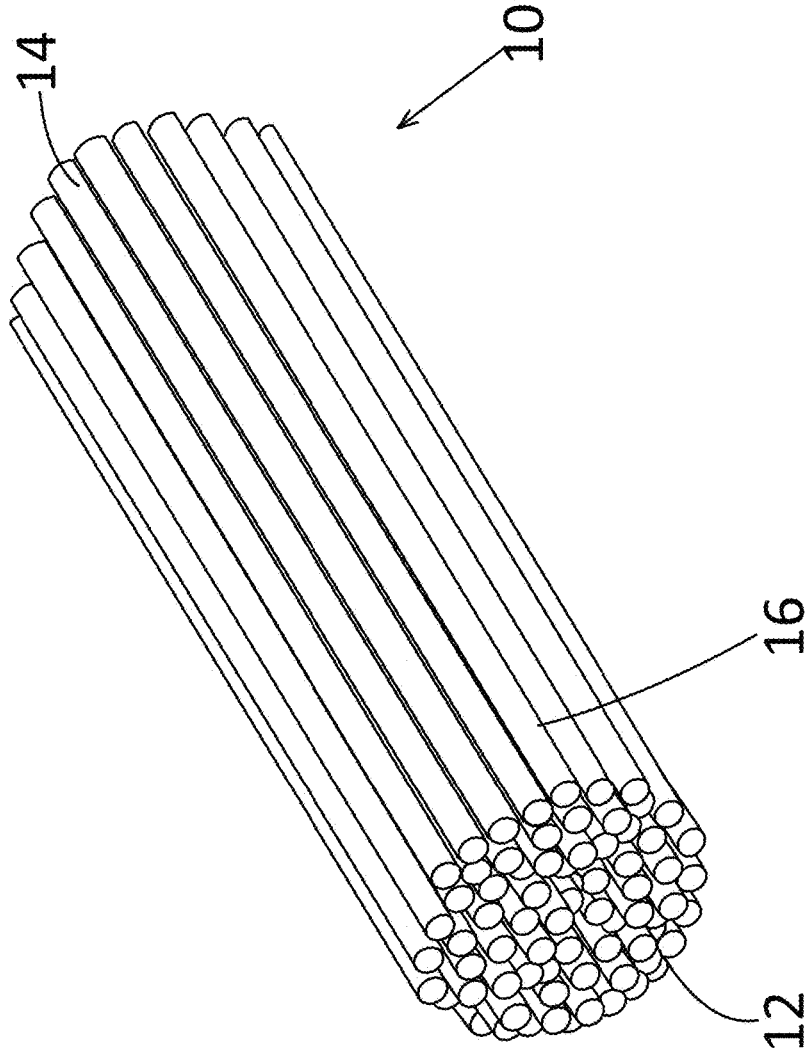
FIG. 1 is a perspective view of a bundle of linear wires that form a vibration-damping rope according to one embodiment of the rope used in the disclosed inventive concept.

In the following figures, the same reference numerals will be used to refer to the same components. In the following description, various operating parameters and components are described for different constructed embodiments. These specific parameters and components are included as examples and are not meant to be limiting.

The disclosed inventive concept is illustrated in the accompanying figures in which alternative embodiments of an elastomeric bushing for a vehicle suspension having improved thermal conductivity and damping capacity are shown. It is to be understood that other variations of the disclosed inventive concept are possible, including without limitation other applications of the elastomeric bushing beyond use in a vehicle suspension.

Figure 2:
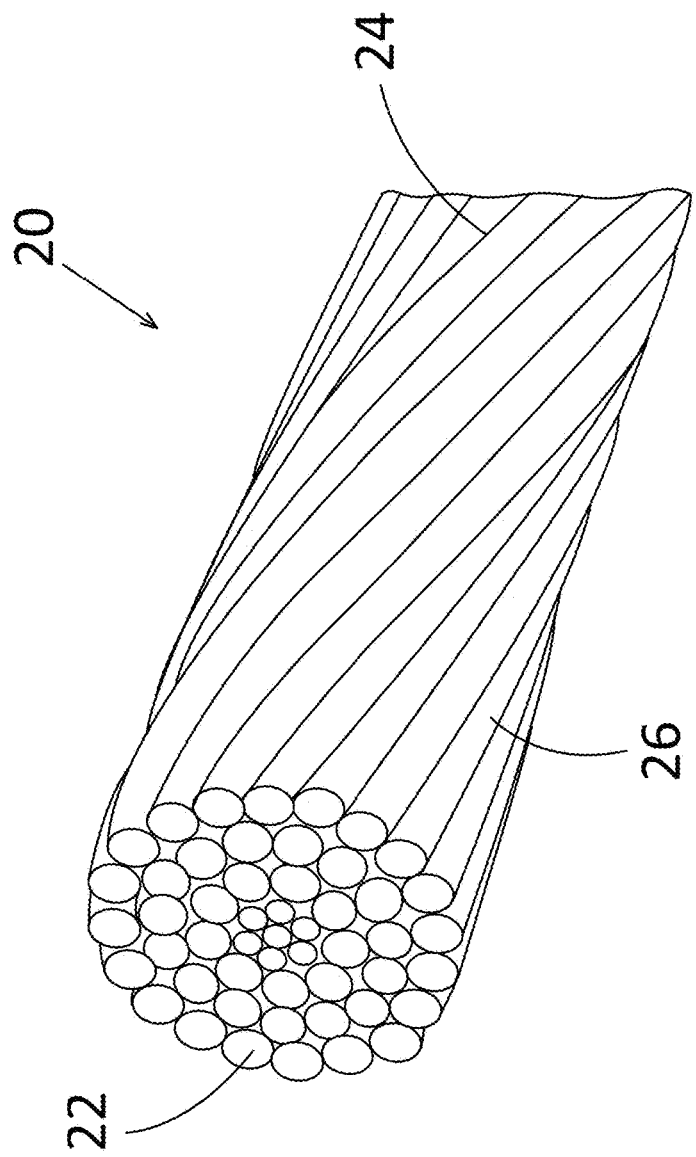
FIG. 2 is a perspective view of a bundle of twisted wires that form a vibration-damping rope according to another embodiment of the rope used in the disclosed inventive concept.
Figure 3:
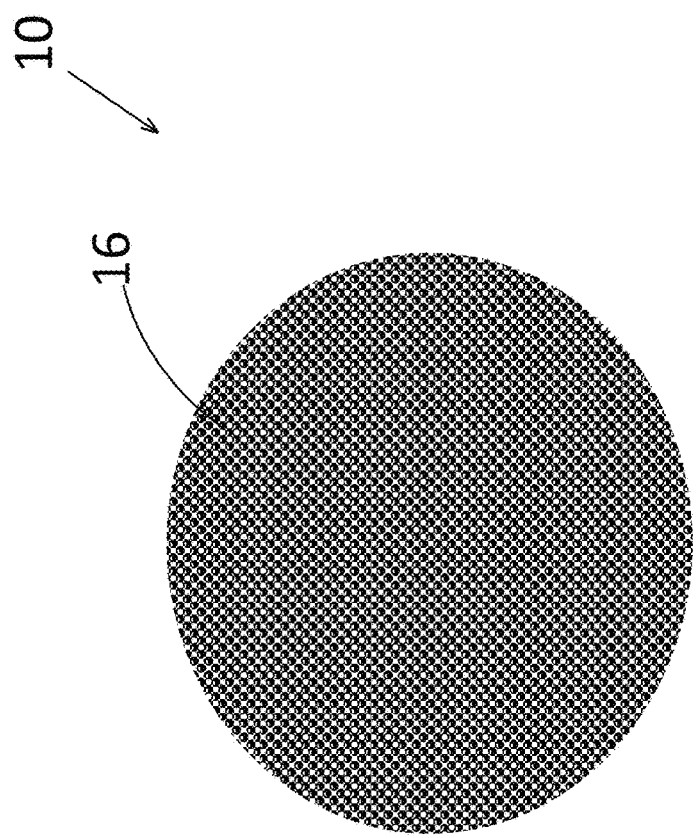
FIG. 3 is a sectional view of a bundle of wires that form a vibration-damping rope according to the disclosed inventive concept.

The accompanying figures and the associated description illustrate the construction and use of vibration-damping ropes according to the disclosed inventive concept. Particularly, FIGS. 1 through 3 illustrate the vibration-damping rope itself. FIGS. 4 through 8 illustrate various embodiments of an elastomeric bushing according to the disclosed inventive concept in which both ropes and wire mesh are illustrated in various configurations in which contact with the inner tube and the outer tube is illustrated.

Referring to FIG. 1, a vibration-damping rope, generally illustrated as 10, includes a first end 12 and a second end 14 according to one embodiment of the disclosed inventive concept. The vibration-damping rope 10 includes a plurality of unwrapped wires 16. According to this embodiment, the unwrapped wires 16 are provided in a linear arrangement as illustrated in FIG. 1.

Referring to FIG. 2, a vibration-damping rope, generally illustrated as 20, includes a first end 22 and a second end 24 according to another embodiment of the disclosed inventive concept. The vibration-damping rope 20 includes a plurality of unwrapped wires 26. According to this embodiment, the wires 26 are twisted in a helical fashion as illustrated in FIG. 2.

The length and diameter of the bare wires used in the disclosed inventive concept as illustrated in FIGS. 1 and 2 and in the other figures are only suggestive and are not intended as being limiting. Similarly, the number, diameter, and internal configuration of the wires as illustrated are also only suggestive. The individual wires that form the rope may be configured in a linear or helical manner.

A greater or lesser number of wires may be incorporated than illustrated in FIGS. 1 through 3. By adjusting the length and diameter of the individual vibration-damping rope and by adjusting the number, diameter, and internal configuration of the wires, the thermal conductivity and damping characteristics according to the disclosed inventive concept may be virtually infinitely tuned for a broad variety of applications. The wires are preferably made of steel although other metals may be selected for this use. The wires rope may be made of the same metal or of different metals.

A sectional view of only the rope 10 (or the rope 20) is illustrated in FIG. 3. The rope 10 is comprised of a series of individual wires 16 (or the rope 20 is comprised of a series of individual wires 26).

The vibration-damping rope of the disclosed inventive concept has virtually unlimited applications and may be employed in any component that includes an elastomeric material to function as a bushing regardless of shape and application. Because of the many conceivable variations of rope length and diameter, it may be adapted for a virtually unlimited number of uses without compromising its dampening effectiveness. Accordingly, so as not to limit the broad use of the invention as a vibration dampener according to the disclosed inventive concept, the vibration-damping rope of the disclosed inventive concept is illustrated in potential uses as shown in FIGS. 4 through 8.

Figure 4:
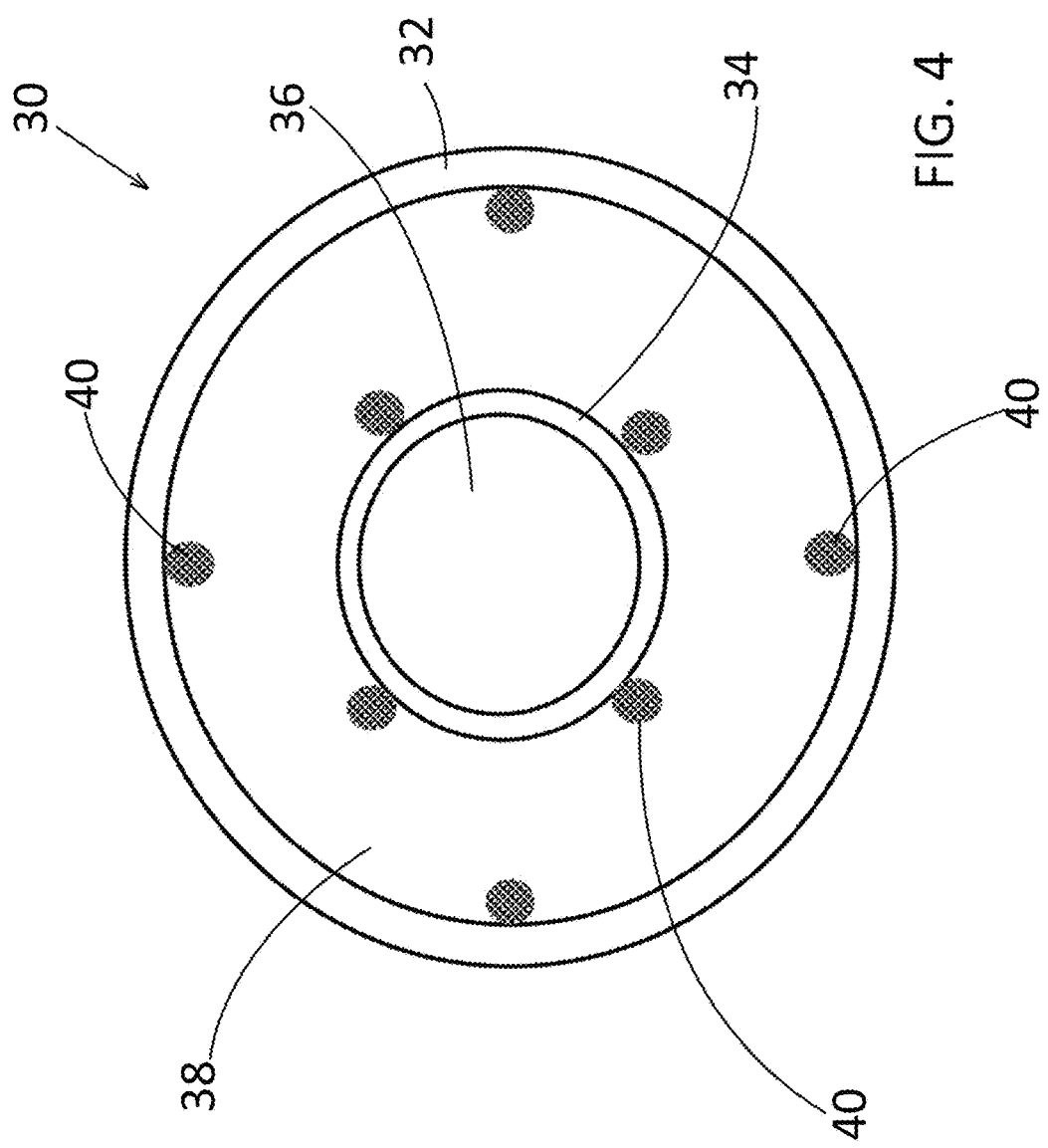
FIG. 4 is a sectional view of an elastomeric bushing having embedded vibration-damping ropes for improved damping capacity according to the disclosed inventive concept.

An example of bundles of rope being formed within an elastomeric bushing is illustrated in FIG. 4. According to this figure, an elastomeric bushing for a vehicle suspension, generally illustrated as 30, is shown in cross section. The elastomeric bushing 30 includes an outer sleeve or tube 32 and an inner tube 34. Both the outer tube 32 and the inner tube 34 are composed of steel or of a similar metal. A hollow central region 36 is formed in the inner tube 34.

An elastomeric material 38 comprising a natural or synthetic rubber or a polyurethane is formed between the outer tube 32 and the inner tube 34. A plurality of thermoconductive and dampening wires or wire bundles 40 is positioned within the elastomeric material 38 on formation of the elastomeric bushing 30. As illustrated, certain wires or wire bundles 40 are strategically positioned adjacent to or against the inner surface of the outer tube 32 and the rest of the wires or wire bundles 40 are strategically positioned adjacent to or against the inner surface of the inner tube 34. A greater or lesser number of wires or bundles 40 may be used. In addition, placement of the wires or wire bundles 40 may also be other than that shown. For example, all of the wires or wire bundles 40 may be positioned adjacent one or the other of the inner surface of the outer tube 32 or the inner tube 34. In addition, one or more of the wires or wire bundles 40 may be positioned away from the inner surface of the outer tube 32 or the inner tube 34.

Figure 5:
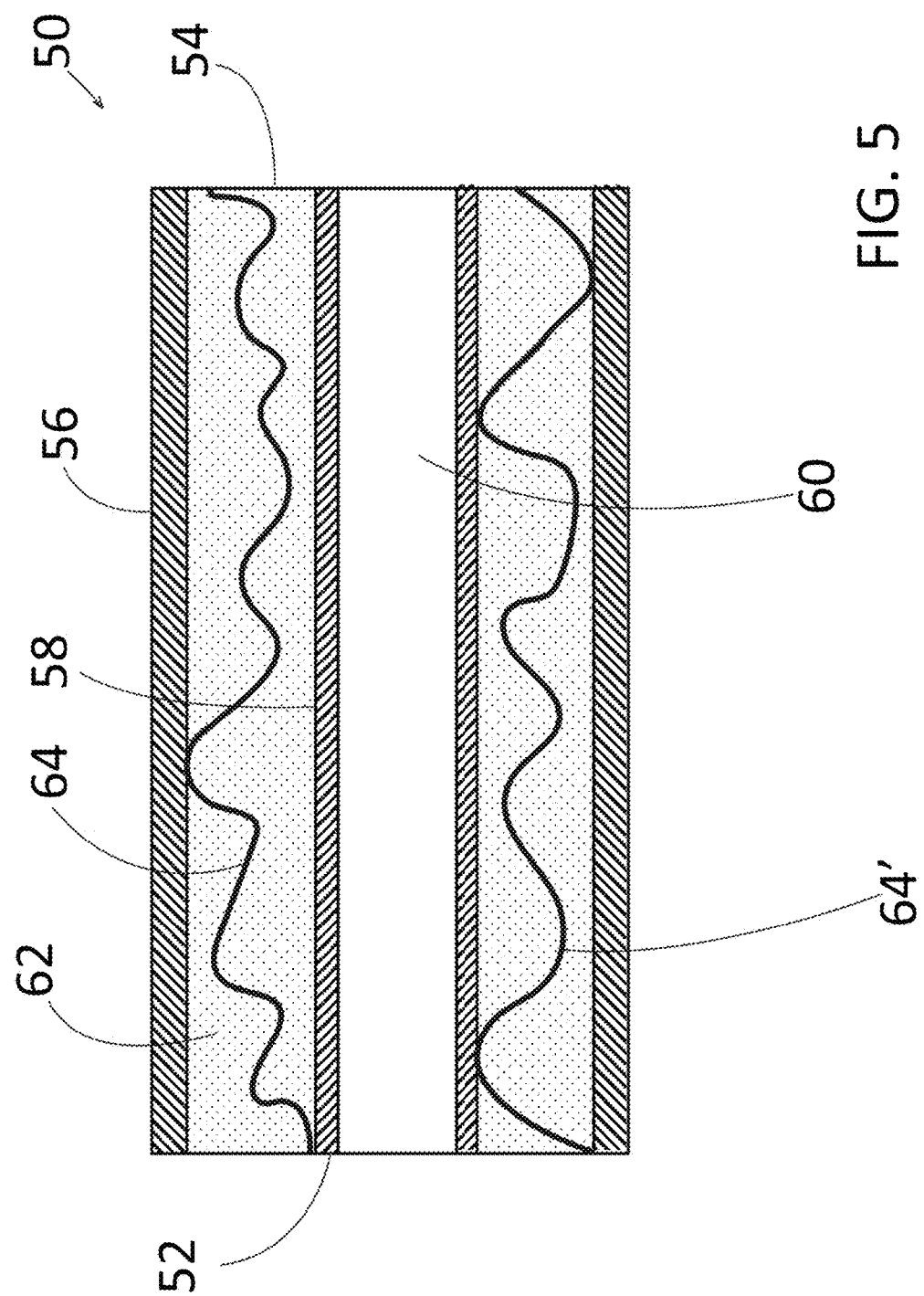
FIG. 5 is a view of a longitudinal sectional view of an elastomeric bushing having embedded vibration-damping ropes for improved damping capacity according to one embodiment of the disclosed inventive concept in which the ends of the ropes extend to the ends of the bushing.

Referring to FIG. 5, a longitudinal sectional view of elastomeric bushing for vehicle suspension having improved thermal conductivity and damping characteristics according to one embodiment of the disclosed inventive concept is illustrated. The elastomeric bushing, generally illustrated as 50, includes a first end 52 and an opposed second end 54. The length and width of the elastomeric bushing 50 may be different from the illustrated configuration without deviating from the scope or spirit of the invention.

The elastomeric bushing 50 includes an outer tube 56 and a spaced apart, concentric inner tube 58 having a hollow center 60. Preferably but not absolutely both the outer tube 56 and the inner tube 58 are composed of a metal such as steel.

Between the outer tube 56 and the inner tube 58 is formed an elastomeric core 62 formed from a material such as natural rubber, synthetic rubber or polyurethane. To provide improved thermoconductive and damping characteristics according to this embodiment, the elastomeric bushing 50 includes wire bundles 64 and 64' that extend generally from the first end 52 to the second end 54. It is to be understood that while two wire bundles 64 and 64' are illustrated, only a single wire bundle may be used or more than two bundles may be used depending on use and desired thermoconductive and damping characteristics. In this way the disclosed inventive concept may be specifically tuned for a given application. Furthermore, the wire bundles 64 and 64' may be attached to an inner surface of either the outer tube 56 or the inner tube 58.

Figure 6:
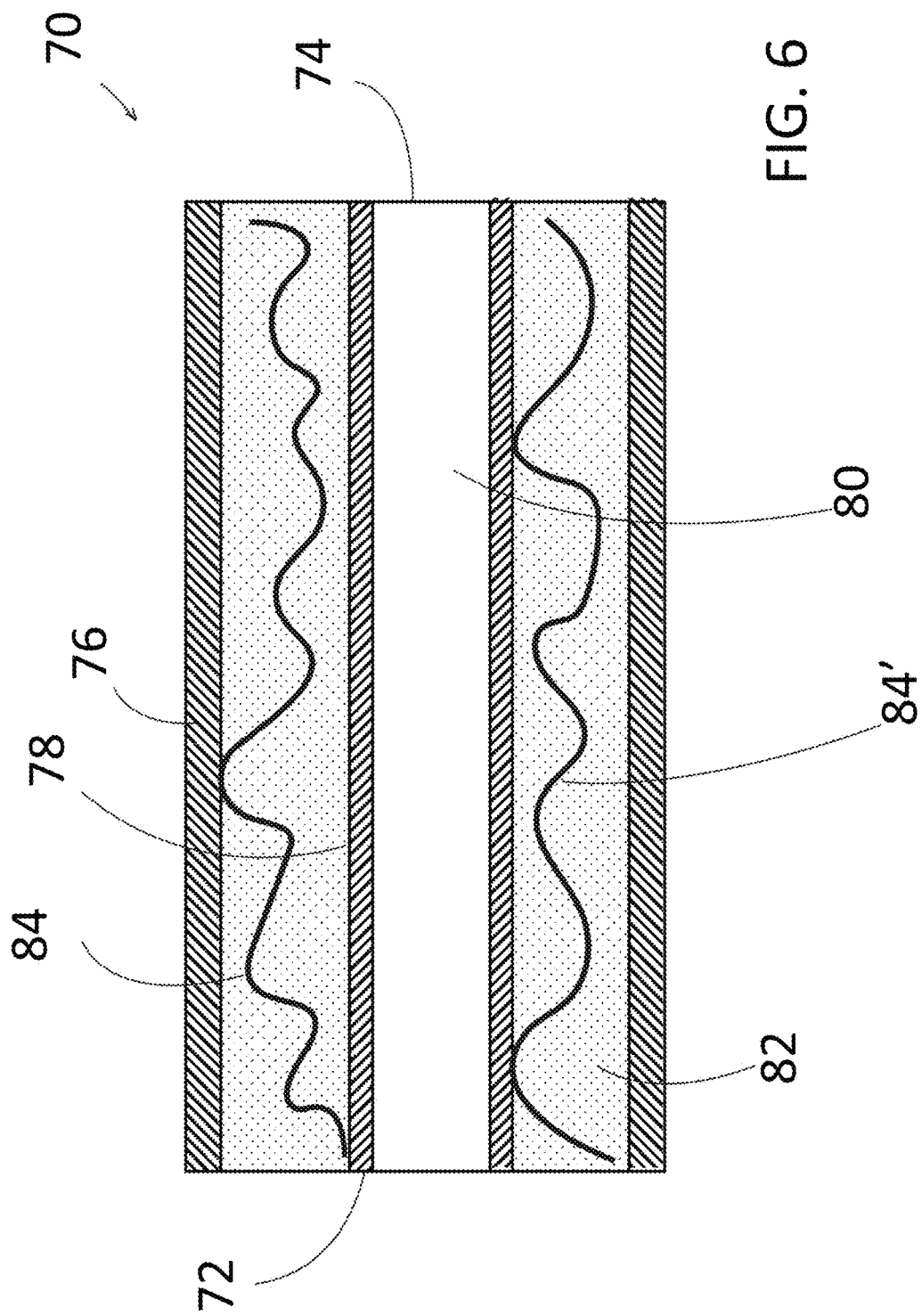
FIG. 6 is a view of a longitudinal sectional view of an elastomeric bushing having embedded vibration-damping ropes for improved damping capacity according to another embodiment of the disclosed inventive concept in which the ends of the ropes do not extend to the ends of the bushing.

Referring to FIG. 6, a longitudinal sectional view of elastomeric bushing for vehicle suspension having improved thermal conductivity and damping characteristics according to an additional embodiment of the disclosed inventive concept is illustrated. The elastomeric bushing, generally illustrated as 70, includes a first end 72 and an opposed second end 74. The length and width of the elastomeric bushing 70 may be different from the illustrated configuration without deviating from the scope or spirit of the invention.

The elastomeric bushing 70 includes an outer tube 76 and a spaced apart, concentric inner tube 78 having a hollow center 80. Preferably but not absolutely both the outer tube 76 and the inner tube 78 are composed of a metal such as steel.

Between the outer tube 76 and the inner tube 78 is formed an elastomeric core 82 formed from a material such as natural rubber, synthetic rubber or polyurethane. To provide improved thermoconductive and damping characteristics according to this embodiment, the elastomeric bushing 70 includes non-entangled wire bundles 84 and 84' that extend generally from a point adjacent to but not in contact with the first end 72 to a point adjacent to but not in contact with the second end 74. It is to be understood that while two wire bundles 84 and 84' are illustrated, only a single wire bundle may be used or more than two bundles may be used depending on use and desired thermoconductive and damping characteristics. In this way the disclosed inventive concept may be specifically tuned for a given application. Furthermore, the wire bundles 84 and 84' may be attached to an inner surface of either the outer tube 76 or the inner tube 78.

Figure 7:
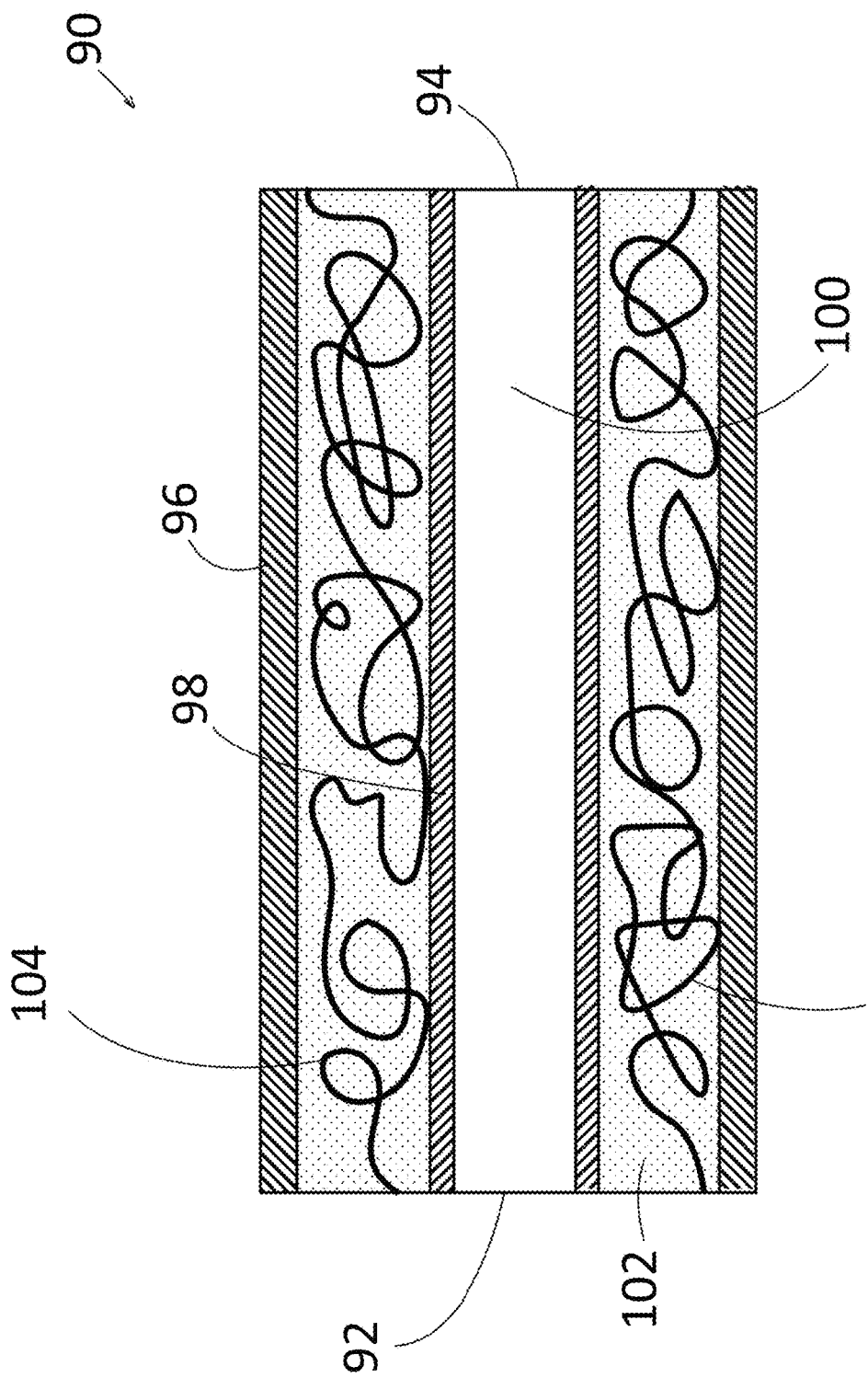
FIG. 7 is a view of a longitudinal sectional view of an elastomeric bushing having embedded vibration-damping ropes for improved damping capacity according to yet another embodiment of the disclosed inventive concept in which the rope is entangled.

Referring to FIG. 7, a longitudinal sectional view of elastomeric bushing for vehicle suspension having improved thermal conductivity and damping characteristics according to an additional embodiment of the disclosed inventive concept is illustrated. The elastomeric bushing, generally illustrated as 90, includes a first end 92 and an opposed second end 94. The length and width of the elastomeric bushing 90 may be different from the illustrated configuration without deviating from the scope or spirit of the invention.

The elastomeric bushing 90 includes an outer tube 96 and a spaced apart, concentric inner tube 98 having a hollow center 100. Preferably but not absolutely both the outer tube 96 and the inner tube 98 are composed of a metal such as steel.

Between the outer tube 96 and the inner tube 98 is formed an elastomeric core 102 formed from a material such as natural rubber, synthetic rubber or polyurethane. To provide improved thermoconductive and damping characteristics according to this embodiment, the elastomeric bushing 90 includes entangled wire bundles 104 and 104' that extend generally from the first end 92 to the second end 94, although one or both ends of the entangled wire bundles 104 and 104' may extend from points just adjacent to the first end 92 or the second end 94. It is to be understood that while two wire bundles 104 and 104' are illustrated, only a single wire bundle may be used or more than two bundles may be used depending on use and desired thermoconductive and damping characteristics. In this way the disclosed inventive concept may be specifically tuned for a given application. Furthermore, the wire bundles 104 and 104' may be attached to an inner surface of either the outer tube 96 or the inner tube 98.

Figure 8:
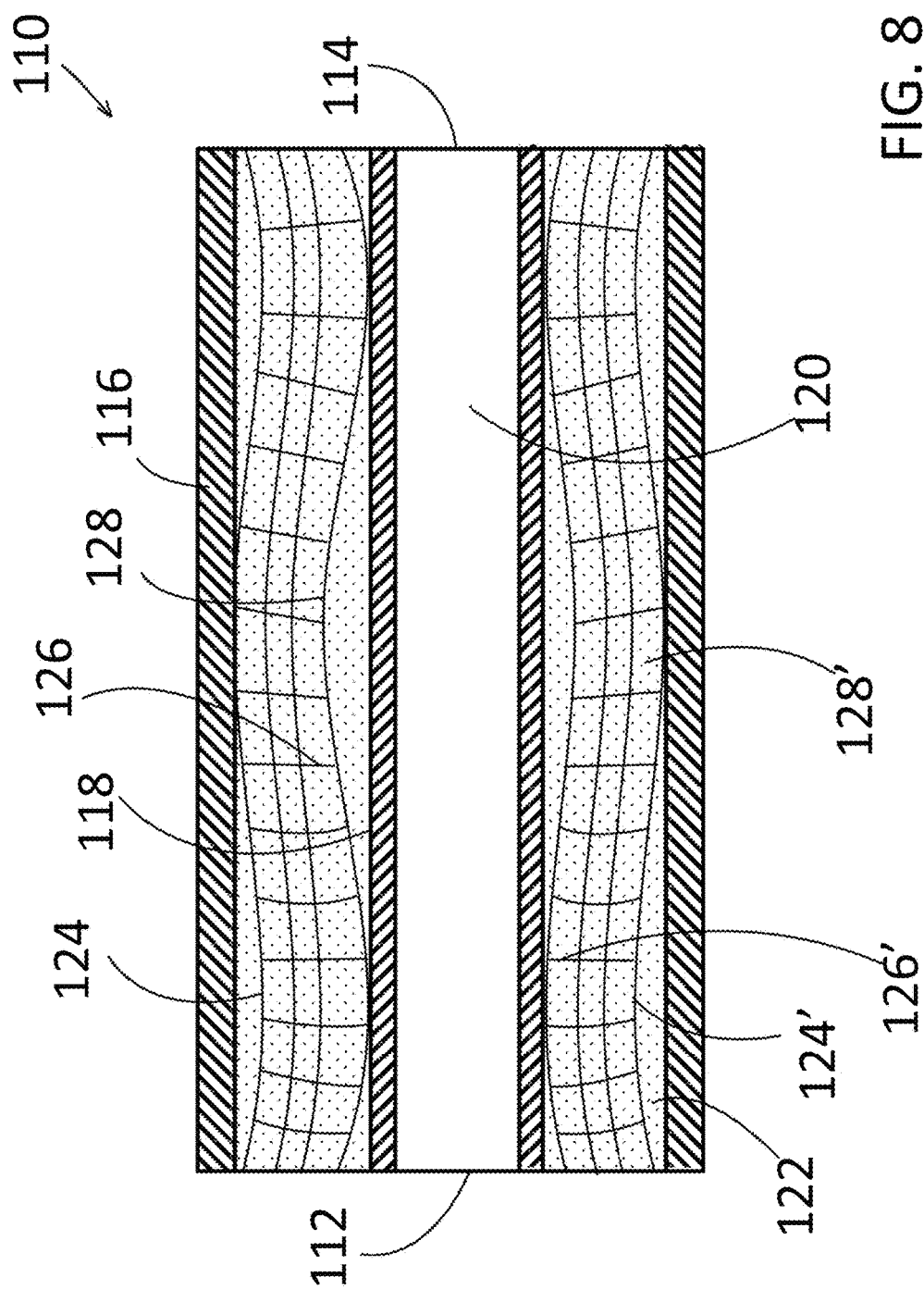
FIG. 8 is a view of a longitudinal sectional view of an elastomeric bushing having embedded vibration-damping ropes for improved damping capacity according to yet another embodiment of the disclosed inventive concept in which the rope is in mesh form.

Referring to FIG. 8, a longitudinal sectional view of elastomeric bushing for vehicle suspension having improved thermal conductivity and damping characteristics according to another embodiment of the disclosed inventive concept is illustrated. The elastomeric bushing, generally illustrated as 110, includes a first end 112 and an opposed second end 114. The length and width of the elastomeric bushing 110 may be different from the illustrated configuration without deviating from the scope or spirit of the invention.

The elastomeric bushing 110 includes an outer tube 116 and a spaced apart, concentric inner tube 118 having a hollow center 120. Preferably but not absolutely both the outer tube 116 and the inner tube 118 are composed of a metal such as steel.

Between the outer tube 116 and the inner tube 118 is formed an elastomeric core 122 formed from a material such as rubber or polyurethane. To provide improved thermoconductive and damping characteristics according to this embodiment, the elastomeric bushing 110 includes wire mesh elements such as the wire mesh elements 124 and 124' that may or may not extend completely between the first end 112 and the second end 114 of the elastomeric bushing 110.

The wire mesh 124 includes a plurality of individual wires bundled together to form an array of wire ropes 126 that run in a first direction Y and an array of wire ropes 128 that run in a second direction Y. The wire mesh 124' includes a plurality of individual wires bundled together to form an array of wire ropes 126' that run in a first direction Y and an array of wire ropes 128' that run in a second direction Y.

It is to be understood that while different embodiments of elastomeric bushings are illustrated and discussed herein as each having non-entangled wire bundles, entangled wire bundles, or wire meshes, two or more such non-entangled or entangled wire bundles or meshes may be used in a single busing in combination. Furthermore, while it is illustrated above in FIG. 5 that the wires extend from one end of the elastomeric bushing to another and in FIG. 6 that the wires extend from a position close to but not at the ends of the elastomeric bushing, these arrangements are not exclusive but may be used in combination.

One skilled in the art will readily recognize from such discussion, and from the accompanying drawings and claims that various changes, modifications and variations can be made therein without departing from the true spirit and fair scope of the invention as defined by the following claims.

What is claimed is:

1. A bushing for use between components, the bushing comprising:
   inner and outer metal tubes, each tube having an inner wall;
   an elastomeric material formed between said inner walls; and
   at least one bundle of metal wires positioned within said material and against one of said inner walls, whereby slidable contact of the surfaces of the individual wires relative to one another and metal-to-metal contact with said inner walls improves thermal conductivity and dampens resonant vibration.

2. The bushing for use between components of claim 1, wherein said outer tube has a first end, said inner tube has a first end, said outer tube has a second end and said inner tube has a second end, wherein said at least one bundle of metal wires extends from said first ends of said outer and inner tubes and said second ends of said outer and inner tubes.

3. The bushing for use between components of claim 1, wherein said outer tube has a first end, said inner tube has a first end, said outer tube has a second end and said inner tube has a second end, wherein said at least one bundle of metal wires extends from an area adjacent said first ends of said outer and inner tubes and an area adjacent said second ends of said outer and inner tubes.

4. The bushing for use between components of claim 1, wherein said at least one bundle of metal wires comprises a plurality of bundles arranged in a wire mesh.

5. The bushing for use between components of claim 4 in which said wire mesh includes a plurality of bundles extending generally lengthwise relative to the bushing and a plurality of bundles extending generally perpendicular with respect to said plurality of bundles extending generally lengthwise.

6. The bushing for use between components of claim 1 wherein said wires of said bundle are arranged linearly relative to one another.

7. The bushing for use between components of claim 1 wherein said wires of said bundle are arranged helically relative to one another.

8. A bushing for use between two or more components, the bushing comprising:
   an outer metal tube having a central area;
   an inner metal tube positioned in said central area of said outer tube;
   an elastomeric material formed between said tubes; and
   at least one bundle of metal wires positioned within said material and at least partially against at least one of said tubes, whereby slidable contact of the surfaces of each of said wires relative to one another and metal-to-metal contact with at least one of said tubes improves thermal conductivity and dampens resonant vibration of the bushing, said at least one bundle of metal wires having a first end and a second end, said first end and said second end being fully embedded within said elastomeric material.

9. The bushing for use between two or more components of claim 8, wherein said outer tube has a first end, said inner tube has a first end, said outer tube has a second end and said inner tube has a second end, wherein said at least one bundle of metal wires extends from said first ends of said outer and inner tubes and said second ends of said outer and inner tubes.

10. The bushing for use between two or more components of claim 8, wherein said outer tube has a first end, said inner tube has a first end, said outer tube has a second end and said inner tube has a second end, wherein said at least one bundle of metal wires extends from an area adjacent said first ends of said outer and inner tubes and an area adjacent said second ends of said outer and inner tubes.

11. The bushing for use between two or more components of claim 8, wherein said at least one bundle of metal wires comprises a plurality of bundles arranged in a wire mesh.

12. The bushing for use between two or more components of claim 11 in which said wire mesh includes a plurality of bundles extending generally lengthwise relative to the bushing and a plurality of bundles extending generally perpendicular with respect to said plurality of bundles extending generally lengthwise.

13. The bushing for use between two or more components of claim 8 wherein said outer tube includes an inner surface and at least one of said bundles of metal wires is positioned against said inner surface to allow for conductive heat transfer between said wires and said inner surfaces of said tube.

14. The bushing for use between two or more components of claim 8 wherein at least one of said bundles of metal wires is positioned against said inner tube.

15. The bushing for use between two or more components of claim 8 wherein said wires of said bundle are arranged linearly relative to one another.

16. The bushing for use between two or more components of claim 8 wherein said wires of said bundle are arranged helically relative to one another.

17. A method of forming a bushing for use between two or more components, the method comprising:
   forming at least one bundle of metal wires, said at least one bundle of metal wires being aligned linearly or helically, said at least one bundle of metal wires having an intermediate portion;
   forming an outer tube having an inner wall;
   forming an inner tube having an inner wall;
   positioning said intermediate portion of said at least one bundle of metal wires against one of said inner walls; and
   injecting an elastomeric material between said tubes.

18. The method of forming a bushing for use between two or more components of claim 17, wherein said outer tube has a first end, said inner tube has a first end, said outer tube has a second end and said inner tube has a second end, wherein said at least one bundle of metal wires extends from said first ends of said outer and inner tubes and said second ends of said outer and inner tubes.

19. The method of forming a bushing for use between two or more components of claim 17, wherein said outer tube has a first end, said inner tube has a first end, said outer tube has a second end and said inner tube has a second end, wherein said at least one bundle of metal wires extends from an area adjacent said first ends of said outer and inner tubes and an area adjacent said second ends of said outer and inner tubes.

20. The method of forming a bushing for use between two or more components of claim 17, wherein said at least one bundle of metal wires comprises a plurality of bundles arranged in a pattern, said pattern being selected from the group consisting of entangled bundles, non-entangled bundles, and wire mesh.

\* \* \* \* \*